United States Patent
Sandhu et al.

(10) Patent No.: US 10,814,479 B2
(45) Date of Patent: Oct. 27, 2020

(54) AUTOMATED ASSEMBLY STATION

(71) Applicant: NYX, Inc., Livonia, MI (US)

(72) Inventors: Ram S. Sandhu, Northville, MI (US); Ronald D. Scholz, Waterford, MI (US)

(73) Assignee: NYX, Inc., Livonia, MI (US)

( * ) Notice: Subject to any disclaimer, the term of this patent is extended or adjusted under 35 U.S.C. 154(b) by 10 days.

(21) Appl. No.: 15/995,242

(22) Filed: Jun. 1, 2018

(65) Prior Publication Data

US 2018/0345487 A1 Dec. 6, 2018

Related U.S. Application Data

(60) Provisional application No. 62/514,139, filed on Jun. 2, 2017.

(51) Int. Cl.
| | |
|---|---|
| *B25J 9/00* | (2006.01) |
| *B25J 9/10* | (2006.01) |
| *B25J 9/02* | (2006.01) |
| *B25J 9/16* | (2006.01) |
| *B25J 13/08* | (2006.01) |

(52) U.S. Cl.
CPC .......... *B25J 9/1005* (2013.01); *B25J 9/0009* (2013.01); *B25J 9/02* (2013.01); *B25J 9/1612* (2013.01); *B25J 9/1669* (2013.01); *B25J 9/1674* (2013.01); *B25J 13/085* (2013.01)

(58) Field of Classification Search
CPC ...... B25J 9/1005; B25J 9/1612; B25J 9/1669; B25J 9/0009; B25J 9/02; B25J 13/085; B25J 9/1674
See application file for complete search history.

(56) References Cited

U.S. PATENT DOCUMENTS

| | | | | |
|---|---|---|---|---|
| 4,725,081 | A * | 2/1988 | Bauer | ................... F16L 37/148 285/305 |
| 8,538,583 | B2 * | 9/2013 | Kim | ....................... B25J 9/1612 700/260 |
| 10,300,604 | B2 * | 5/2019 | Ochiishi | ................ B25J 9/1694 |

\* cited by examiner

*Primary Examiner* — Rick K Chang
(74) *Attorney, Agent, or Firm* — Carlson, Gaskey & Olds, P.C.

(57) ABSTRACT

An automated assembly station includes a mobile platform for holding a first workpiece, a robot having a moveable arm, and a controller. The moveable arm includes a load cell and a gripper that is adapted to grasp a second workpiece. The robot is operable to use the moveable arm and gripper to insert the second workpiece into a locked position on a mating part of the first workpiece. The load cell is operable to measure an amount of insertion force used to insert the second workpiece into the locked position. The controller is configured to record the insertion force and trigger an alarm in response to the insertion force exceeding a predesignated threshold insertion force.

17 Claims, 4 Drawing Sheets

AUTOMATED ASSEMBLY STATION

CROSS-REFERENCE TO RELATED APPLICATION

The present disclosure claims priority to U.S. Provisional Patent Application No. 62/514,139 filed Jun. 2, 2017.

BACKGROUND

Assemblies, such as automotive assemblies that are secured together into a functional component, can be assembled manually, in an automated fashion, or using a combination of manual and automated processes. Automated processes, while rapid, can be subject to defects that arise from alignment, defective sub-components, and the like, some of which are challenging to detect using traditional observation or quality assurance measures.

SUMMARY

An automated assembly station according to an example of the present disclosure includes a mobile platform for holding a first workpiece, and a robot that has a moveable arm. The moveable arm has a load cell and a gripper adapted to grasp a second workpiece. The robot is operable to use the moveable arm and gripper to insert the second workpiece into a locked position on a mating part of the first workpiece. The load cell is operable to measure an amount of insertion force used to insert the second workpiece into the locked position, and a controller is configured to record the insertion force and trigger an alarm in response to the insertion force exceeding a predesignated threshold insertion force.

In a further embodiment of any of the foregoing embodiments, the robot is configured to, after insertion of the second workpiece into the locked position, use the moveable arm and gripper to apply a pulling force on the second workpiece to test whether the second workpiece is secure in the locked position on the first workpiece.

In a further embodiment of any of the foregoing embodiments, the controller is configured to record the pulling force and trigger an alarm in response to the pulling force failing to reach a predesignated pulling force.

In a further embodiment of any of the foregoing embodiments, the gripper includes opposed first and second nests for grasping the second workpiece, and the first and second nests, when brought together, define a cavity that has a cavity profile which matches the second workpiece.

In a further embodiment of any of the foregoing embodiments, the first and second nests are formed of a polymer yoke that defines the cavity profile.

In a further embodiment of any of the foregoing embodiments, the first and second nests include a metal shell holding the polymer yoke.

In a further embodiment of any of the foregoing embodiments, the insertion of the second workpiece into the locked position on the mating part of the first workpiece includes engaging a spring lock by moving the second workpiece onto the first workpiece and overcoming a spring force of the spring lock.

In a further embodiment of any of the foregoing embodiments, the robot is a 6-axis robot.

A method for use with an automated assembly station according to an example of the present disclosure includes holding a first workpiece in a mobile platform, using a robot, which has a moveable arm with a load cell and a gripper adapted to grasp a second workpiece, to insert the second workpiece into a locked position on a mating part of the first workpiece, using the load cell to measure an amount of insertion force used to insert the second workpiece into the locked position, and recording the insertion force and triggering an alarm in response to the insertion force exceeding a predesignated threshold insertion force.

A further embodiment of any of the foregoing embodiments includes, after insertion of the second workpiece into the locked position, using the moveable arm and gripper to apply a pulling force on the second workpiece to test whether the second workpiece is secure in the locked position on the first workpiece.

A further embodiment of any of the foregoing embodiments includes recording the pulling force and triggering an alarm in response to the pulling force failing to reach a predesignated pulling force.

A further embodiment of any of the foregoing embodiments includes providing the gripper with opposed first and second nests to grasp the second workpiece. The first and second nests, when brought together, define a cavity that has a cavity profile which matches the second workpiece.

In a further embodiment of any of the foregoing embodiments, the first and second nests are formed of a polymer yoke that defines the cavity profile.

In a further embodiment of any of the foregoing embodiments, the first and second nests include a metal shell holding the polymer yoke.

In a further embodiment of any of the foregoing embodiments, the insertion of the second workpiece into the locked position on the mating part of the first workpiece includes engaging a spring lock by moving the second workpiece onto the first workpiece and overcoming a spring force of the spring lock.

In a further embodiment of any of the foregoing embodiments, the robot is a 6-axis robot.

An automated assembly station according to an example of the present disclosure includes a mobile platform for holding a first workpiece, and a robot that has a moveable arm. The moveable arm includes a load cell and a gripper adapted to grasp a second workpiece. The robot is operable to use the moveable arm and gripper to insert the second workpiece into a locked position on a mating part of the first workpiece, and after insertion of the second workpiece into the locked position, use the moveable arm and gripper to apply a pulling force on the second workpiece to test whether the second workpiece is secure in the locked position on the first workpiece. The load cell is operable to measure the pulling force. A controller is configured to record the pulling force and trigger an alarm in response to the pulling force failing to reach a predesignated pulling force.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
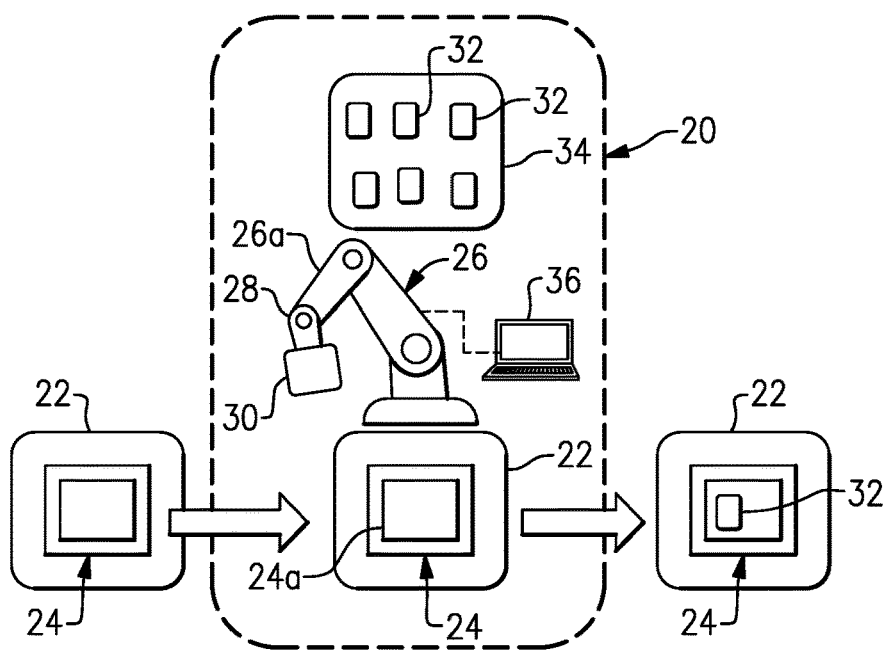
FIG. 1 illustrates an example automated assembly station.

FIG. 1 schematically illustrates an automated assembly station 20 ("station 20"). As will be described, the station 20 provides the capability to reliably assemble workpieces by measuring and monitoring assembly forces.

The station 20 includes a mobile platform 22 for holding a first workpiece 24. As used herein, "mobile" refers to the ability of the platform to be moved to and from the station 20, without having to remove the workpiece(s) from the platform. For example, the mobile platform 22, prior to being received at the station 20 may be located at another assembly station. The mobile platform 22 is then moved, typically in an automated fashion, to the station 20 for one or more assembly procedures. The mobile platform 22 is subsequently moved from the station 20, such as to a next assembly station if further assembly is required. The workpiece 24, along with any components that are added to it during assembly, remain secured on the mobile platform 22 during the movement to and from the station 20.

The station 20 includes a robot 26. For example, the robot 26 is a 6-axis robot that has at least one moveable arm 26a. The 6-axis robot may generally be of known construction and operation, with the ability to move about axes commonly identified as S, L, U, R, B, and T axes. The moveable arm 26a includes a load cell 28 and a gripper 30 that is adapted to grasp a second workpiece 32. For example, the second workpieces 32 may be located in a bin 34 near the robot 26. The robot 26 may be programmed using a controller 36 to pick up one of the second workpieces 32 from the bin 34 and insert it onto the first workpiece 24 in the assembly procedure.

The robot 26 is operable, through programming of the controller 36, to use the moveable arm 26a and gripper 30 pick up the second workpiece 32 and insert it into a locked position on a mating part 24a of the first workpiece 24. Thus as mobile platforms 22 with the first workpieces 24 cycle through the station 20, the robot 26 assembles the second workpieces 32 onto the first workpieces 24. As will be appreciated, although the station 20 is shown as receiving one mobile platform 24 at a time, it could easily be adapted to receive two or more mobile platforms and/or include multiple robots to perform assembly on multiple first workpieces as a "batch." Moreover, the first workpieces 24 may be of the same or different designs.

The load cell 28 is in-line in the arm 26a of the robot 26. As a result, the load cell 28 transmits, and can thus measure, assembly loads as the robot 26 assembles the second workpieces 32 onto the first workpieces 24. For instance, the load cell 28 may be of a type that is able to measure compression loads, tension loads, or both, transmitted through the arm 26a. As an example, the load cell 28 is operable to measure an amount of insertion force (i.e., compression force) used to insert the second workpiece 32 into the locked position on the mating part 24a of the first workpiece 24. The measurements are typically in the form of electrical signals that are proportional in magnitude to the load force. The signals are transmitted to the controller 36.

The controller 36 may include hardware (e.g., a microprocessor, a memory, a monitor, a keyboard, etc.), software, or combinations thereof, that can be programmed to carry out or perform the functions described herein. The controller 36 may be a single, dedicated device that is integrated with the robot 26, for example. Alternatively, some or all of the controller 36 or its functions may be centralized in a remotely located computing device or devices. The controller 36 receives the signals and records the signals in memory.

The controller 36 is programmed with a predesignated threshold insertion force. For instance, a user may set the predesignated threshold insertion force. The predesignated threshold insertion force may be based on a defect condition or the like which is undesired in the end product. Such conditions may be determined experimentally based on the design of the end use component and programming of the station 20 for the particular assembly process. The controller 36 compares the recorded insertion forces to the predesignated threshold insertion force and if the recorded insertion force exceeds the predesignated threshold insertion force, the controller 36 responsively triggers an alarm (or other fault). For example, the alarm may be a visual or audible indication to a user. In other words, an excessive insertion force is used as an indicator of improper assembly, which may be due to misalignment of the workpieces 24/32, robot 26, and/or mobile platform 22.

In a further example, the robot 26 is also configured to, after insertion of the second workpiece 32 into the locked position, use the moveable arm 26a and gripper 30 to apply a pulling force on the second workpiece 32 to test whether the second workpiece 32 is secure in the locked position on the first workpiece 24. For example, the robot 26 may be programmed through the controller 36 to perform this functionality. The load cell 30 also measures the pulling force (i.e., tension force), which is recorded in the controller 36. The controller 36 compares the recorded pulling forces to a predesignated pulling force and if the recorded pulling force fails to reach the predesignated pulling force, the controller 36 responsively triggers an alarm (or other fault). For example, the alarm may be a visual or audible indication to a user. In other words, if the second workpiece 32 is improperly assembled and easily pulls off of the first workpiece 24 during the test, the pulling force will not reach the predesignated pulling force. Thus, by monitoring both insertion force and pull-off force, the station can better ensure reliable assembly.

Figure 2:
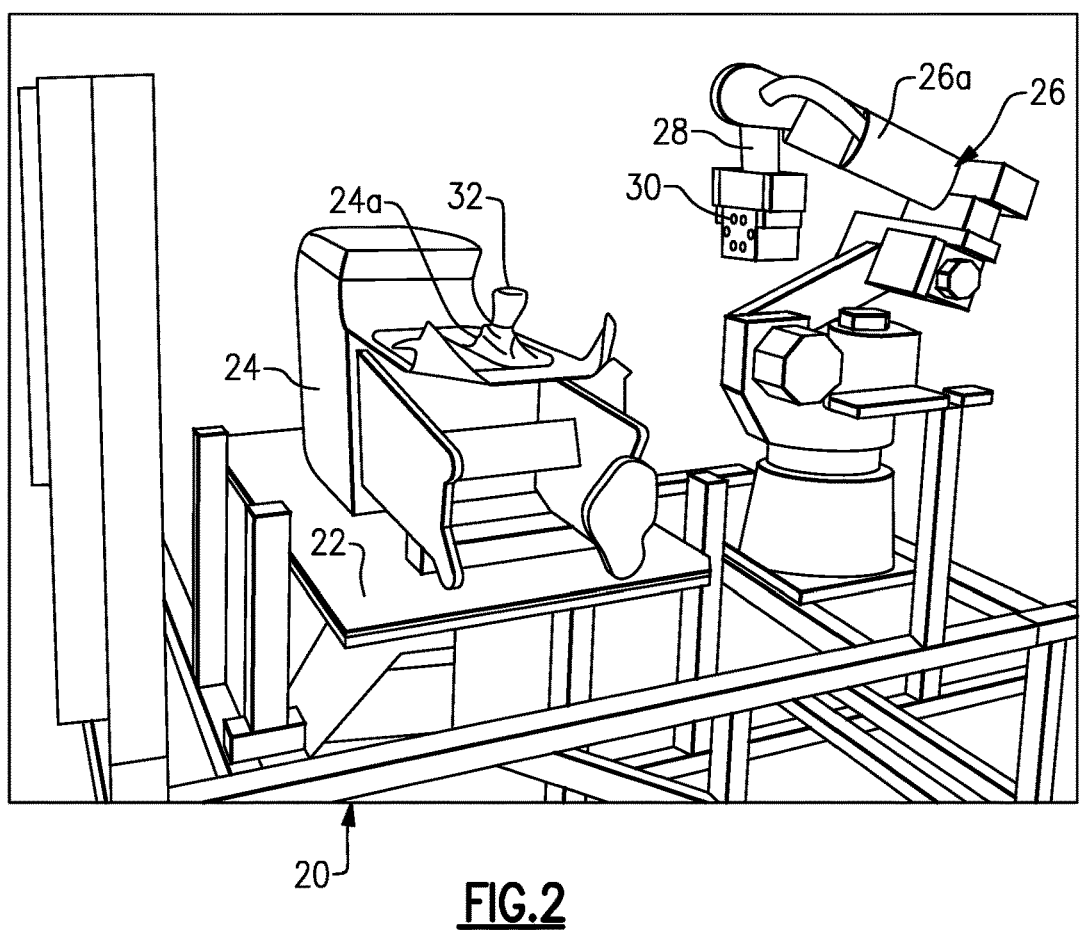
FIG. 2 illustrates an example implementation of an automated assembly station.
Figure 3:
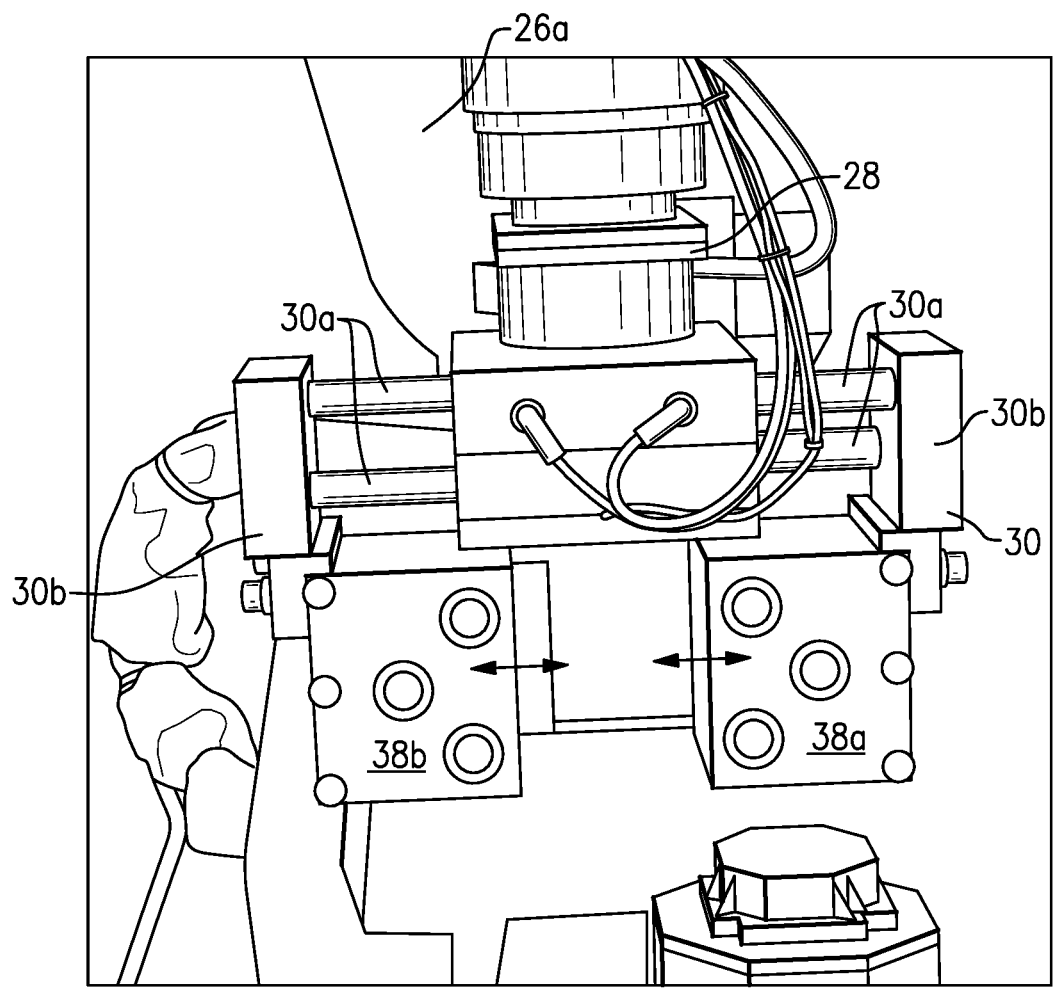
FIG. 3 illustrates a portion of a moveable arm of a robot of the station, with a load cell, gripper, and gripper nests.

FIG. 2 illustrates an additional example implementation of the automated assembly station 20. In this example, the first workpiece 24 is an automotive console piece and the second workpiece 32 is a shifter knob that is to be inserted onto a mating shaft 24a. As shown in FIG. 3, the gripper 30 includes power cylinders 30a that are operable to move opposed plates 30b. Each plate 30b is attached to opposed first and second nests 38a/38b. The gripper 30 is operable to move the nests 38a/38b between open and closed positions to pick up and release the second workpiece 32.

Figure 4A:
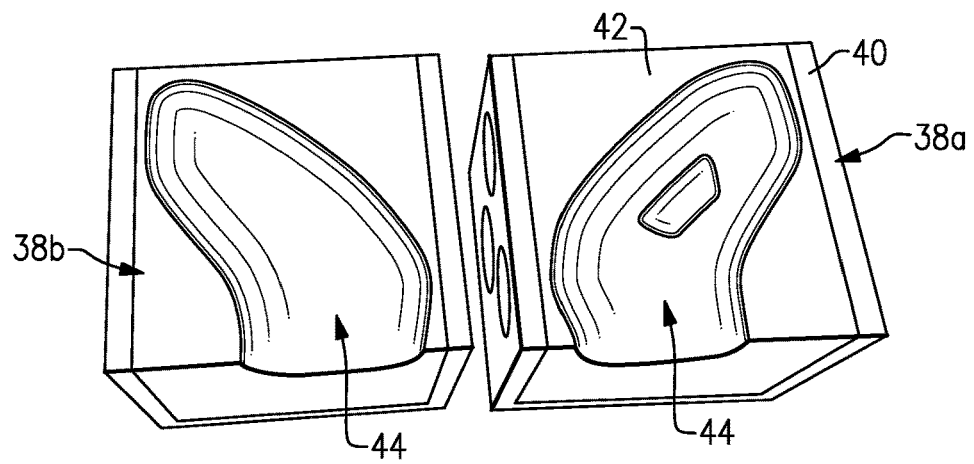
FIG. 4A illustrates an isolated view of the gripper nests.
Figure 4B:
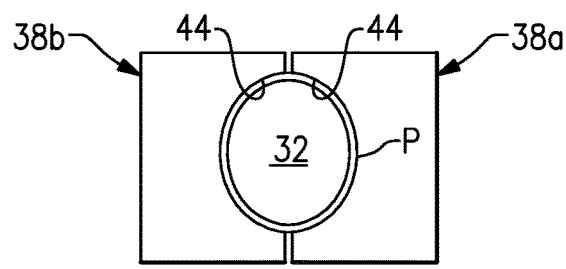
FIG. 4B illustrates a sectioned view of the gripper nests grasping a workpiece.
Figure 4C:
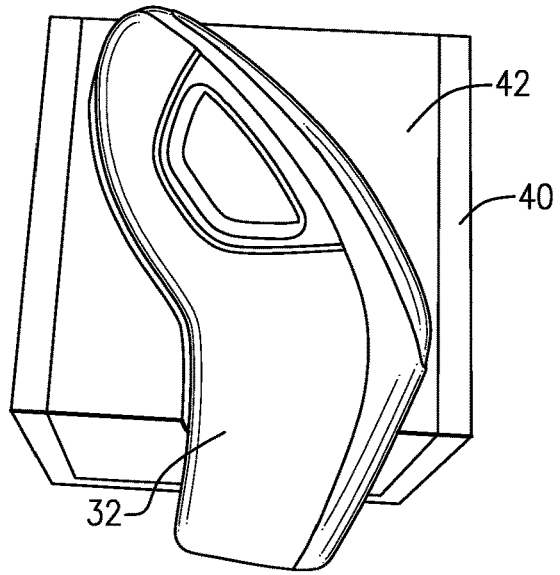
FIG. 4C illustrates one of the gripper nests with a workpiece.

FIGS. 4A and 4B illustrate the nests 38a/38b, and FIG. 4C illustrates one of the nests with a second workpiece 32. In this example, each nest 38a/38b includes a metal shell 40 and a polymer yoke 42. The metal shell 40, such as aluminum, holds and protects the polymer yoke 42, which is relatively softer. The polymer yoke 42 may be molded or machined from a polymer material, such as but not limited to a polyurethane. The polymer material, being relatively softer, is non-marring to the second workpieces 32, allowing damage-free handling during assembly.

The polymer yokes 42 of each nest 38a/38b are formed with cavities 44 such that when the nests 38a/38b are brought together, as shown in FIG. 4B, the cavities 44 define a larger cavity that has a cavity profile P that matches the second workpiece 32. In some cases, a small portion of the second workpiece 32 may protrude from the nests 38a/38b. In particular, the portion that is directly engaged with the mating part 24a protrudes from the nests 38a/38b so that the nests 38a/38b do not interfere with the engagement. For the shifter knob, the neck of the knob may protrude, for example.

The robot 26 uses the nests 38a/38b to securely grasp the second workpiece 32. The match between the cavity profile and the profile shape of the second workpiece 32 prevents or reduces movement of the second workpiece 32 when the second workpiece 32 is in the nests 38a/38b in the grasp of the gripper 30. This permits the robot 26 and gripper 30 to insert the second workpiece 32 onto the mating part 24a without the second workpiece 32 slipping or twisting out of proper alignment (i.e., positive position of the second workpiece 32) and also permits more accurate measurement of the assembly forces.

Figure 5:
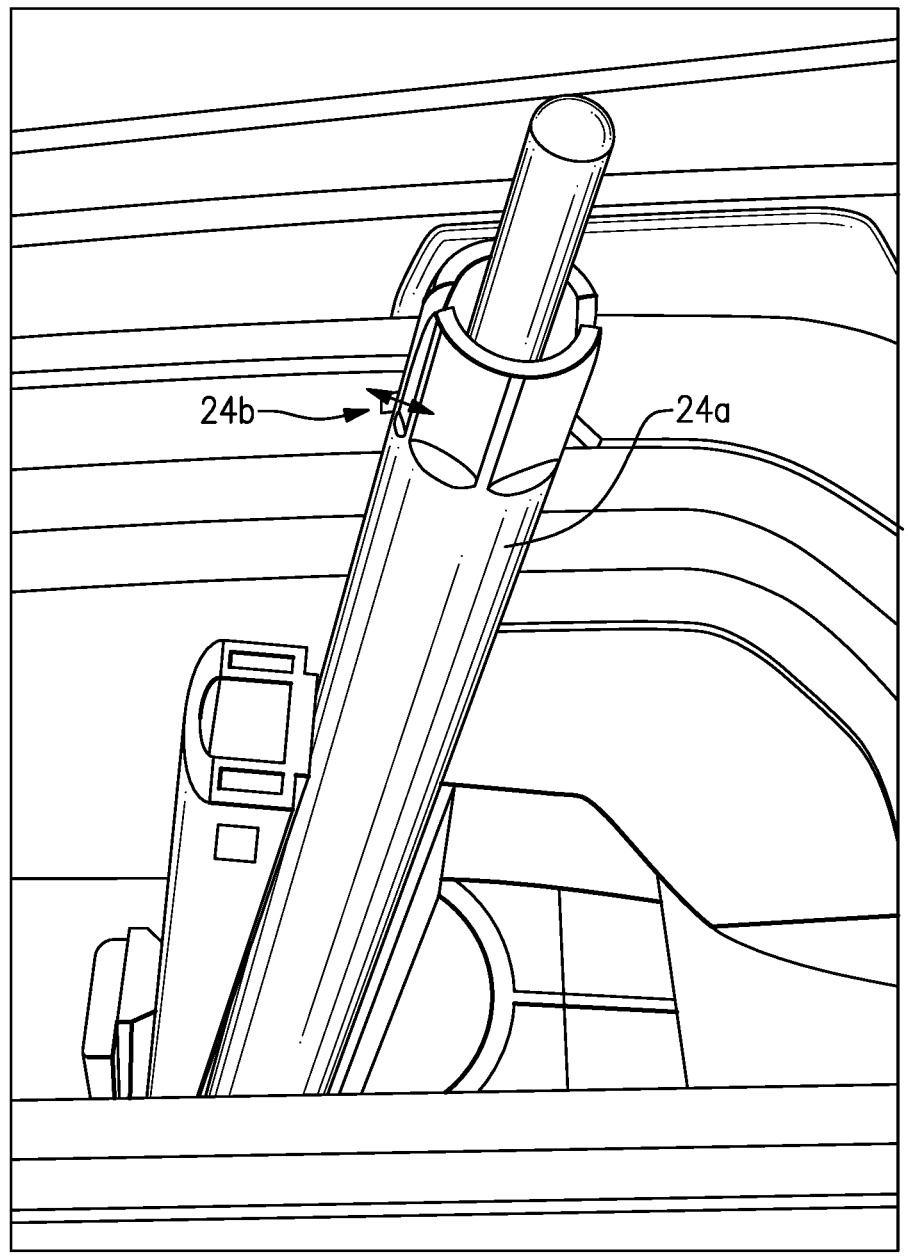
FIG. 5 illustrates a mating part of a workpiece, with a spring lock.

As shown in FIG. 5, the mating part 24a, in this case a shaft, includes one or more spring locks 24b. In order to insert the second workpiece 32 onto the mating part 24a and into the locked position, the insertion force must overcome the bias of the spring lock 24b. For instance, the second workpiece 32 is slid onto the mating part 24a and compresses the spring lock 24b (e.g., into the shaft) to overcome the spring force until the second workpiece 32 moves past the spring lock 24b and the spring lock 24b decompresses to lock the second workpiece 32 in place. If there is misalignment or if the spring lock 24b is defective or working improperly, the insertion force may exceed the predetermined threshold insertion force and thus trigger an alarm as described above. If the spring lock 24b does not properly decompress to lock the second workpiece on the mating part 24a, the pull-off force will not reach the predesignated pulling force and an alarm will be triggered as described above. The station 20 thus provides the capability of not only assembly the workpieces 24/32 but also performing multiple quality checks in the process to thereby ensure greater quality.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An automated assembly station comprising:
    a mobile platform for holding a first workpiece;
    a robot having a moveable arm, the moveable arm including a load cell and a gripper adapted to grasp a second workpiece, the robot being operable to use the moveable arm and gripper to insert the second workpiece into a locked position on a mating part of the first workpiece such that the first workpiece and the second workpiece are secured together, the load cell being operable to measure an amount of insertion compression force used to insert the second workpiece into the locked position, wherein the insertion of the second workpiece into the locked position on the mating part of the first workpiece includes engaging a spring lock by moving the second workpiece onto the first workpiece and overcoming a spring force of the spring lock; and
    a controller configured to record the insertion compression force and trigger an alarm in response to the insertion compression force exceeding a predesignated threshold insertion compression force.

2. The automated assembly station as recited in claim 1, wherein the robot is configured to, after insertion of the second workpiece into the locked position, use the moveable arm and gripper to apply a pulling force on the second workpiece to test whether the second workpiece is secure in the locked position on the first workpiece.

3. The automated assembly station as recited in claim 2, wherein the controller is configured to record the pulling force and trigger an alarm in response to the pulling force failing to reach a predesignated pulling force.

4. The automated assembly station as recited in claim 1, wherein the gripper includes opposed first and second nests for grasping the second workpiece, and the first and second nests, when brought together, define a cavity that has a cavity profile which matches the second workpiece.

5. The automated assembly station as recited in claim 4, wherein the first and second nests are formed of a polymer yoke that defines the cavity profile.

6. The automated assembly station as recited in claim 5, wherein the first and second nests include a metal shell holding the polymer yoke.

7. The automated assembly station as recited in claim 1, wherein the robot is a 6-axis robot.

8. A method for use with an automated assembly station, the method comprising:
    holding a first workpiece in a mobile platform;
    using a robot, which has a moveable arm with a load cell and a gripper adapted to grasp a second workpiece, to insert the second workpiece into a locked position on a mating part of the first workpiece such that the first workpiece and the second workpiece are secured together, wherein the insertion of the second workpiece into the locked position on the mating part of the first workpiece includes engaging a spring lock by moving the second workpiece onto the first workpiece and overcoming a spring force of the spring lock;
    using the load cell to measure an amount of insertion compression force used to insert the second workpiece into the locked position; and
    recording the insertion compression force and triggering an alarm in response to the insertion compression force exceeding a predesignated threshold insertion compression force.

9. The automated assembly station as recited in claim 1, wherein the first workpiece is a console piece that has a shaft and the second workpiece is a shifter knob.

10. The automated assembly station as recited in claim 9, wherein the gripper includes opposed first and second nests for grasping the second workpiece, the first and second nests, when brought together, define a cavity that has a cavity profile which matches the second workpiece, the first and second nests have a polymer yoke that defines the cavity profile and a metal shell holding the polymer yoke.

11. The method as recited in claim 8, further comprising, after insertion of the second workpiece into the locked position, using the moveable arm and gripper to apply a pulling force on the second workpiece to test whether the second workpiece is secure in the locked position on the first workpiece.

12. The method as recited in claim 11, further comprising recording the pulling force and triggering an alarm in response to the pulling force failing to reach a predesignated pulling force.

13. The method as recited in claim 8, providing the gripper with opposed first and second nests to grasp the second workpiece, the first and second nests, when brought together, defining a cavity that has a cavity profile which matches the second workpiece.

14. The method as recited in claim 13, wherein the first and second nests are formed of a polymer yoke that defines the cavity profile.

15. The method as recited in claim 14, wherein the first and second nests include a metal shell holding the polymer yoke.

16. The method as recited in claim 8, wherein the robot is a 6-axis robot.

17. An automated assembly station comprising:
a mobile platform for holding a first workpiece;
a robot having a moveable arm, the moveable arm including a load cell and a gripper adapted to grasp a second workpiece, the robot being operable to
use the moveable arm and gripper to insert the second workpiece into a locked position on a mating part of the first workpiece such that the first workpiece and the second workpiece are secured together through engagement of a spring lock by moving the second workpiece under an insertion compression force onto the first workpiece and overcoming a spring force of the spring lock, and
after insertion of the second workpiece into the locked position, use the moveable arm and gripper to apply a pulling tension force on the second workpiece to test whether the second workpiece is secure in the locked position on the first workpiece, wherein the load cell is operable to measure the pulling tension force; and
a controller configured to record the pulling tension force and trigger an alarm in response to the pulling tension force failing to reach a predesignated pulling tension force.

* * * * *